United States Patent
Shih

[19]

[11] Patent Number: 6,043,688
[45] Date of Patent: Mar. 28, 2000

[54] RATIO METRIC FAULT TOLERANT AND REDUNDANT SERIAL COMMUNICATION SYSTEM

[76] Inventor: Kelvin Shih, 908 Devonshire Blvd., Brighton, Mich. 48116

[21] Appl. No.: 09/038,581

[22] Filed: Mar. 11, 1998

Related U.S. Application Data

[60] Provisional application No. 60/040,468, Mar. 12, 1997.

[51] Int. Cl.[7] .................................................. H03K 5/153
[52] U.S. Cl. .............................. 327/74; 327/63; 327/333; 327/407
[58] Field of Search .................................. 326/10, 11, 14; 327/63, 69, 70, 74, 333, 403, 404, 405, 407, 408, 409, 410, 411, 412, 413, 415, 416, 417

[56] References Cited

U.S. PATENT DOCUMENTS 4,617,473 10/1986 Bingham ................................. 307/66
5,315,185 5/1994 Usimaru ................................. 307/520

*Primary Examiner*—Jeffrey Zweizig
*Attorney, Agent, or Firm*—Fildes & Outland, P.C.

[57] ABSTRACT

A fault tolerant communication system for transmitting a serial data signal through multiple wires regardless of whether one of the wires is open circuited, shorted to ground, shorted to a positive power supply. The system includes at least two communication lines. Each communication line is provided with identical data signals. The outputs of the communication line are adapted such that the active levels of each of the respective data signals appear within a predetermined voltage range. At least two detecting means are coupled to the communication lines. Each of the detecting means transmits one of the respective data signals only if the active levels of at least one of the respective data signals is within the predetermined voltage range. A fault is detected when the active level of any of the data signals is outside the predetermined voltage range. Combining means are coupled to each of the detecting means for combining the respective data signals from the detecting means into a single data signal. The combining means transmits the single data signal only if the active levels of at least one of the respective data signals is within the predetermined voltage range. The system ensures that the correct data signal will be transmitted despite a fault condition on one of the communication lines.

6 Claims, 4 Drawing Sheets

RATIO METRIC FAULT TOLERANT AND REDUNDANT SERIAL COMMUNICATION SYSTEM

This Application claims priority from Provisional Application Ser. No. 60/040,468 filed Mar. 12, 1997.

FIELD OF THE INVENTION

This invention relates to serial data link systems and in particular, a fault tolerant communication system that allows a serial data link system to operate regardless of whether a fault exists in one of the wires of the system.

BACKGROUND OF THE INVENTION

It is known in the art relating to serial data link systems to transmit a large amount of information in a single wire. For critical applications, the standard single line data bus commonly used in serial data link systems is not suitable. Therefore, multiple sets of data lines in physically separated locations carrying the same data are used. Many of these systems are protected against corrupt data by using poling, parity checking or other software error checking methods. However, such systems are not protected against an open circuit, short to ground or short to a positive supply of one of the serial data links which can render the system useless.

U.S. Pat. No. 4,819,225 issued Apr. 4, 1989 in the name of Hochstein addresses this problem by providing a multiplexing system having a missing pulse detector to detect fault conditions, such as an open circuit, short to ground or short to a positive supply. Since all three fault conditions after a certain period of time will result in dc conditions at the input of the receiver of the system, the pulse detector detects a fault when the detector does not receive any pulses for a certain period of time. If a fault is detected, the detector transfers the input after that certain time period to the other working channels. However, during that certain time period in which the receiver is waiting for the missing pulses, a large amount of erroneous data may pass through the serial data links and reach the receiver. This condition can cause unpredictable results. Therefore, it is desirable to provide a system that detects a fault condition in real time and automatically corrects the serial data to represent the correct data bit.

SUMMARY OF THE INVENTION

The present invention provides a fault tolerant system that detects a fault condition, such as an open circuit, short to ground or short to a positive supply in one of the communication lines, in real-time rather then after a certain time period. The system detects a fault condition by differentiating between the pulse heights of a normal transmission of the data signal and the fault condition. As soon as the system detects a difference in the height of the data signal, the system immediately corrects the transmitted data signal. This system can correct fault conditions on pulse by pulse basis.

The fault tolerant communication system of the present invention includes at least two communication lines which are provided with identical data signals. The outputs of the communication lines are adapted such that the active levels of each of the data signals appear within a predetermined voltage range. At least two detecting means are coupled to the at least two communication lines. The detecting means transmits one of the respective data signals only if the active levels of at least one of the respective data signals is within the predetermined voltage range. A fault condition is detected when the active level of one of the data signals is outside of the predetermined voltage range. Combining means are coupled to each of the detecting means for combining the respective data signals from the detecting means into a single data signal. The combining means transmits the single data signal only if the active levels of at least one of the respective data signals is within the predetermined voltage range.

In one embodiment of the present invention, the at least two detecting means comprise window comparators connected to the outputs of the at least two communication lines to detect when the outputs of the at least two communication lines fall within the predetermined voltage range. Each window comparator includes upper and lower comparators having an inverting input and a non-inverting input. The output of one of the respective communication lines is applied to the inverting input of the upper comparator and to the non-inverting input of the lower comparator. A high reference voltage is applied to the non-inverting input of the upper comparator and a low reference voltage is applied to the inverting input of the lower comparator. The output of the upper and lower comparators are high when the output of the communication line falls between the high and low reference voltages and the output is low when the output of the communication line falls outside of the high and low reference voltages.

The outputs of the at least two communication lines are adapted such that the active levels of each of the data signals appear within a predetermined voltage range by providing a voltage divider at the output of the at least two communication lines to define the determined voltage range. The voltage divider may be a resistor tree which defines the predetermined voltage range based on the ratio between resistors in the resistor tree.

The combining means is a logical OR gate having inputs connected to the outputs of the at least two detecting means. Alternatively, three logical NAND gates connected at the outputs of the detecting means may be used to perform as an OR gate.

These and other features and advantages of the invention will be more fully understood from the following detailed description of the invention taken together with the accompanying drawings.

DETAILED DESCRIPTION OF THE INVENTION

Figure 1:
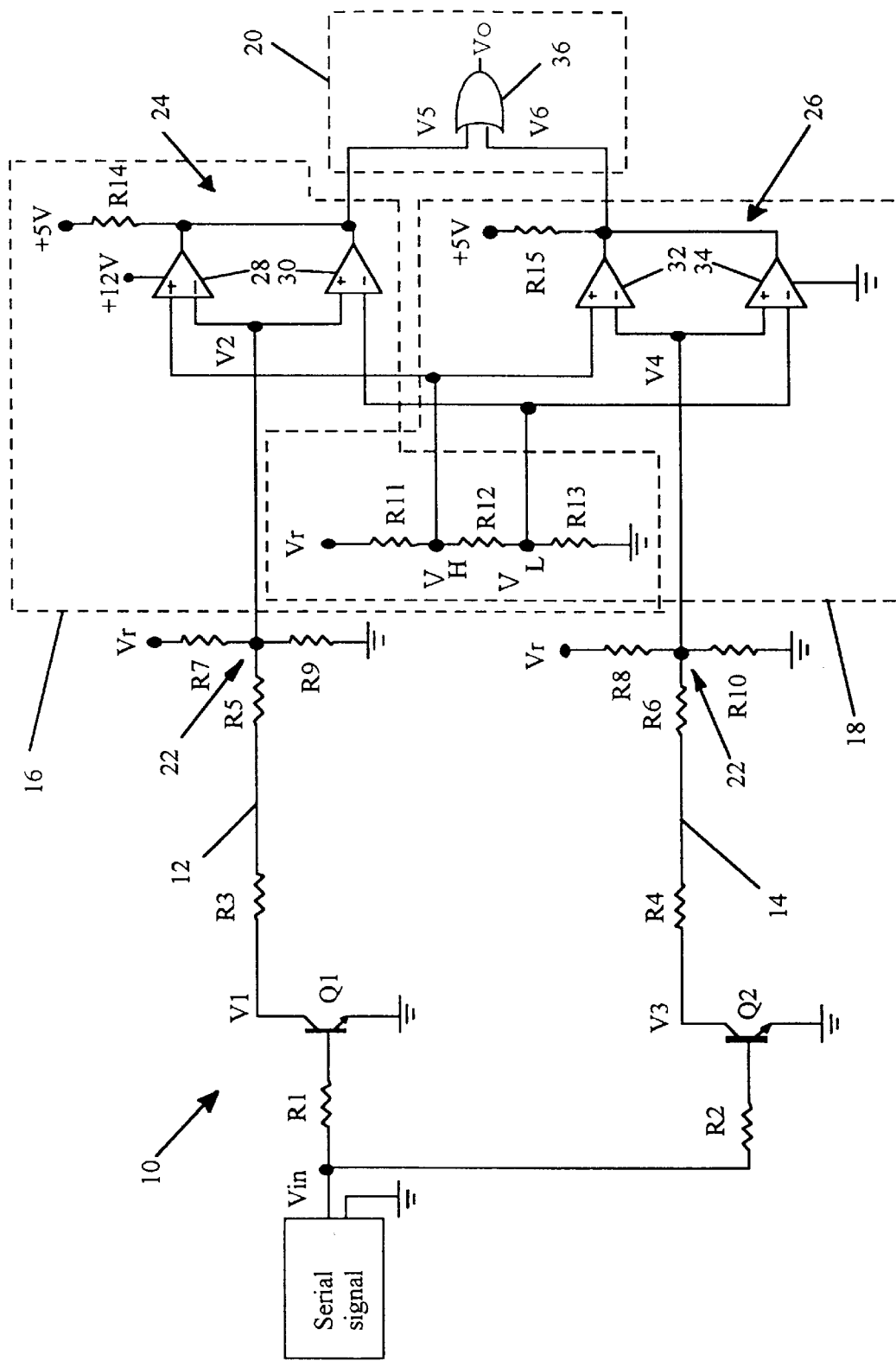
FIG. 1 is a schematic diagram of a fault tolerant communication system in accordance with the present invention.

Referring now to the drawings in detail, numeral 10 generally indicates a fault tolerant communication system that transmits a serial signal along multiple communication lines regardless of whether a fault condition, such as an open circuit, short to ground, short to a positive supply, exists on one of the communication lines. The system 10 detects a fault condition by differentiating between the pulse heights of a normal transmission and a fault condition. As soon as the system 10 detects a difference in the height of the signal, the system immediately corrects the signal. This system 10 can detect fault conditions on pulse by pulse basis.

Referring to FIG. 1, the fault tolerant communication system 10 of the present invention includes at least two communication lines 12, 14, at least two detecting means 16, 18 and combining means 20. The communication lines 12, 14 transmits a data signal therealong between inputs $V_1$, $V_3$ and outputs $V_2$, $V_4$, respectively. A transmitter (not shown) receives a serial data signal $V_{in}$ from an encoder or microprocessor in the form of pulse coded modulation (PCM) or pulse width modulation (PWM). The single serial signal $V_{in}$ has a 0 to 5 volts amplitude and 10 kHz clock frequency. $V_{in}$ is converted to a switch "on", "off" signal by applying the data signal to the bases of transistors Q1, Q2. The transistors Q1, Q2 change the digital pulse signal to a pulse stream seen by detecting means 20 as having two different pulse heights. One pulse height represents a logic low (0) and the other pulse height represents a logic high (1).

By applying the data signal to the bases of the transistors Q1, Q2, the signal is split between the at least two communication lines 12, 14. Transistors Q1, Q2 drive the pulsed data signal along the communication lines 12, 14 through current limiting resistors R3, R4. The serial signal drives the transistors through base resistors R1, R2. Transistors Q1, Q2 are used as switches. When $V_{in}$ is 5 volts, transistors Q1, Q2 are saturated or the switches are closed and the voltages at $V_1$ and $V_3$ are approximately zero. If $V_{in}$ is 0 volts, transistors Q1, Q2 are cutoff or the switches are open.

The active levels of a normal transmission of the data signal $V_{in}$ appear within a predetermined voltage range. To ensure that the normal transmission of the data signal $V_{in}$ appears within the predetermined voltage range, a voltage divider 22 is connected at the output of each of the communication lines 12, 14. Preferably, the voltage dividers 22 are resistor trees. The resistor trees define the predetermined voltage range based on the ratio between resistors in the resistor trees. In FIG. 1, first and second resistor trees consist of resistors R7, R8 and R9, R10, respectively. The data signal $V_{in}$ is applied to the voltages dividers 22 through current-limiting resistors R5 and R6.

The at least two detecting means 16, 18 are coupled to the outputs of the at least two communication lines 12, 14, respectively. The detecting means 16, 18 transmits one of the respective data signals only if the active levels of at least one of the respective data signals is within the predetermined voltage range. A fault is detected by the detecting means 16, 18 by differentiating between the pulse heights of a normal transmission of the data signal and a fault condition. In one embodiment of the present invention, the at least two detecting means 16, 18 comprise window comparators 24, 26 connected to the outputs of the at least two communication lines 12, 14 to detect when the outputs of the at least two communication lines 12, 14 fall within the predetermined voltage range.

The window comparators 24, 26 include upper comparators 28, 32 and lower comparators 30, 34, each having an inverting input and a non-inverting input. The output $V_2$ of the communication line 12 is applied to the inverting input of the upper comparator 28 and to the non-inverting input of the lower comparator 30. A high reference voltage $V_H$ is applied to the non-inverting input of the upper comparator 28 and a low reference voltage $V_L$ is applied to the inverting input of the lower comparator 30. $V_L$ and $V_H$ define the predetermined voltage range. The output $V_5$ of the upper and lower comparators 28, 30 are logical high when the voltage at $V_2$ falls between the high and low reference voltages. The output $V_5$ is logical low when the voltage at $V_2$ falls outside of the high and low reference voltages. The window comparator 26 having upper and lower comparators 32, 34 is similarly connected as window comparator 24 to communication line 14.

Figure 2:
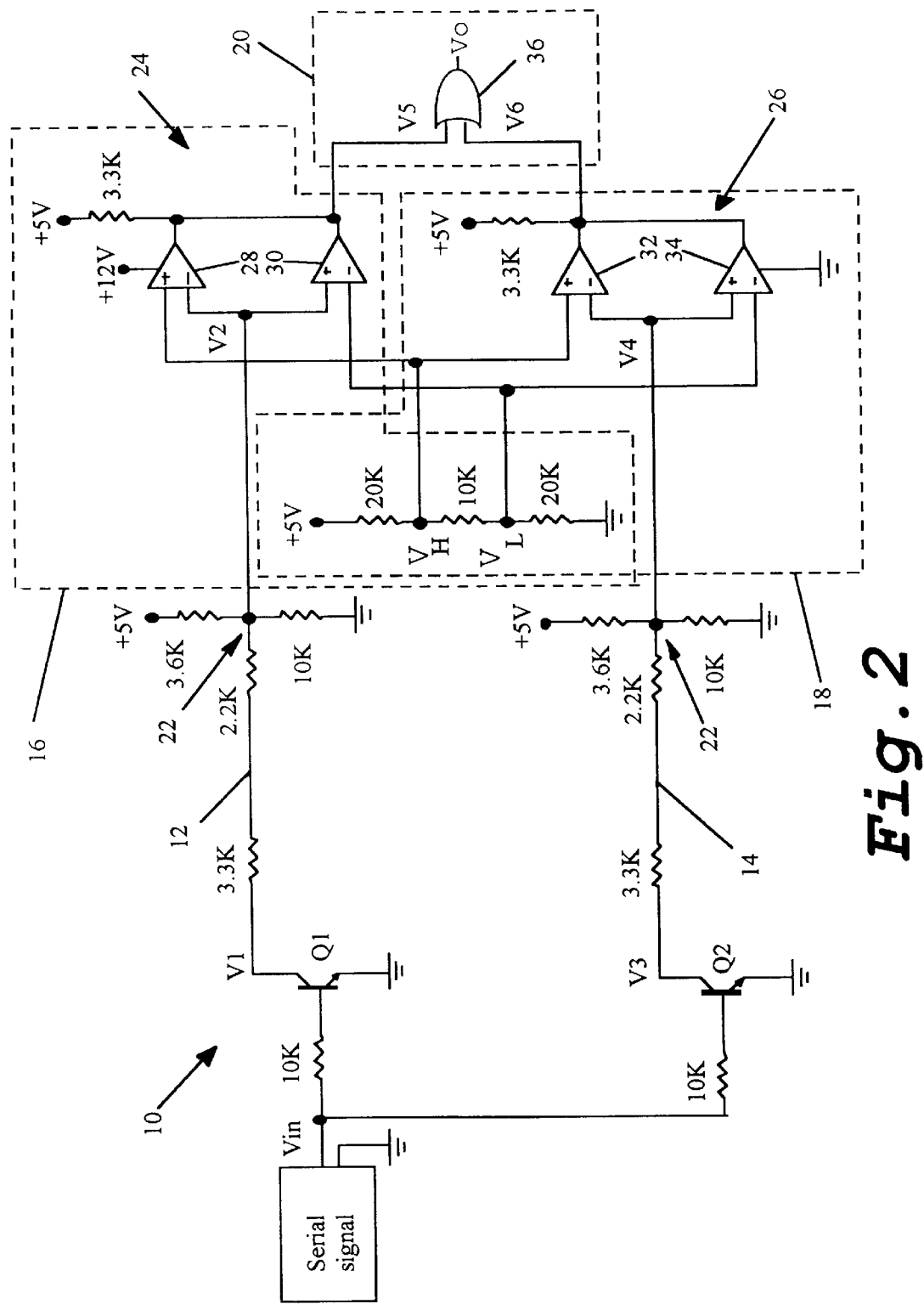
FIG. 2 is a schematic diagram of the fault tolerant communication system of FIG. 1 connected to a 5-volt voltage supply.
Figure 3:
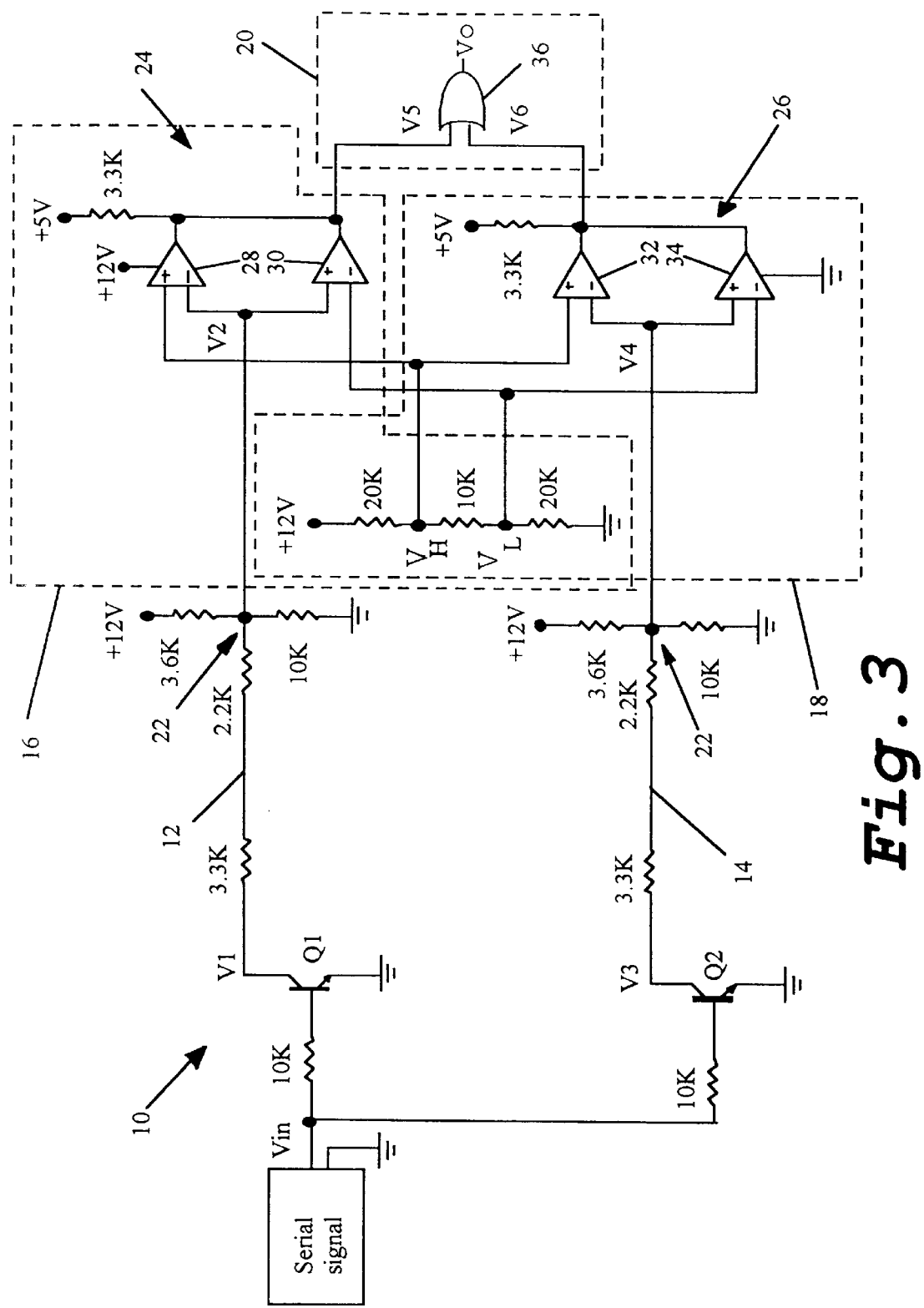
FIG. 3 is a schematic diagram of the fault tolerant communication system of FIG. 1 connected to a 12-volt power source.

Combining means 20 are coupled to output of each of the detecting means for combining the respective data signals from the detecting means into a single data signal, $V_o$. The combining means 20 transmits the single data signal only if the active levels of at least one of the respective data signals is within the predetermined voltage range. A fault is detected when the active level of the data signal is outside of the predetermined voltage range. Referring to FIGS. 1, 2 and 3, the combining means 20 is a logical OR gate 36 having inputs connected to the outputs $V_5$, $V_6$ of the at least two detectors 16, 18. $V_o$ is high when one or more of the detecting means outputs are high.

Figure 4:
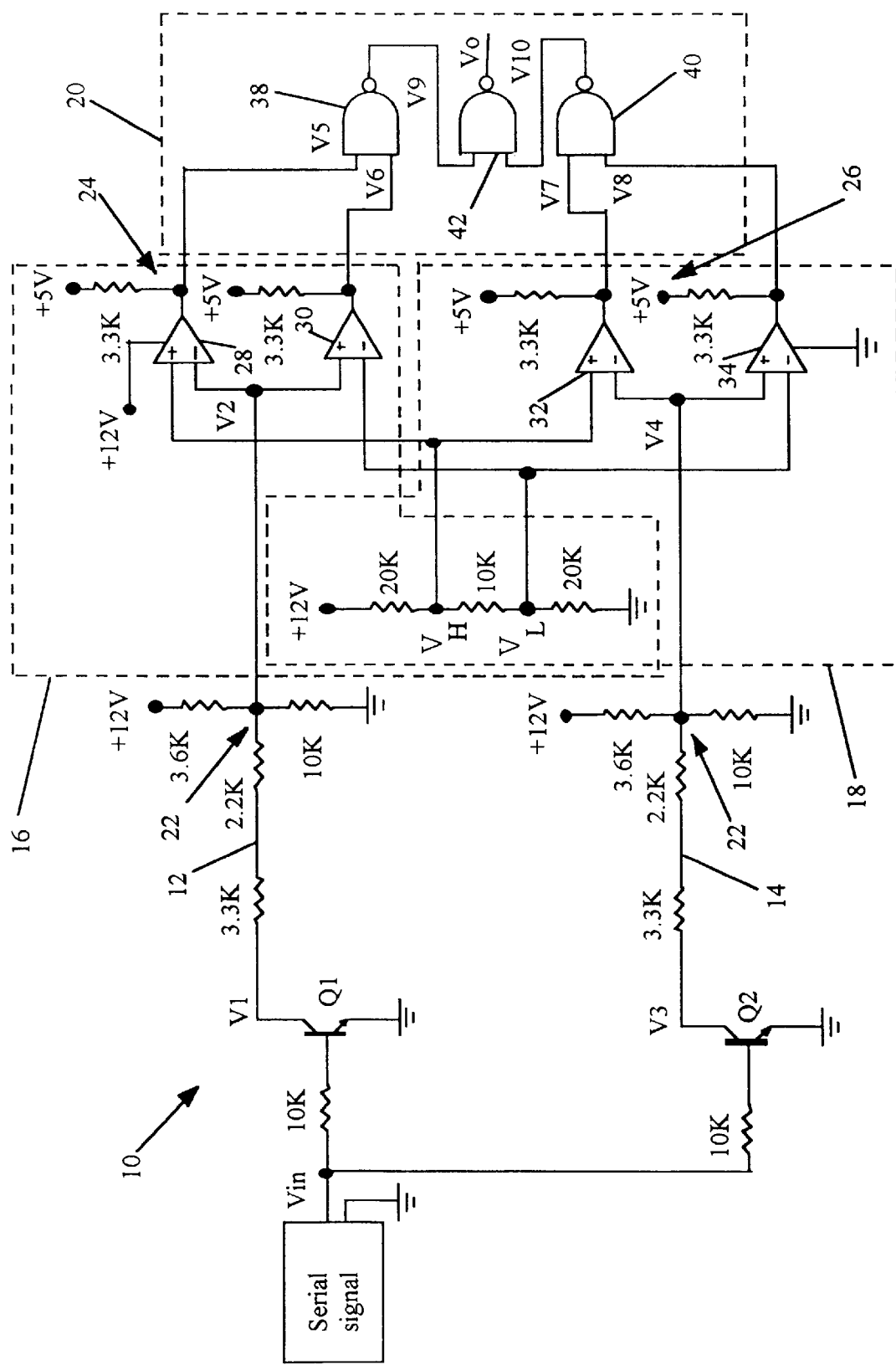
FIG. 4 is a schematic diagram of the fault tolerant communication system in accordance with another embodiment of the present invention.

In FIG. 4, the combining means 20 includes three NAND gates 38, 40, 42. The outputs $V_5$, $V_6$ of the upper and lower comparators 28, 30 are applied to the inputs of NAND gate 38. The outputs $V_7$, $V_8$ of the upper and lower comparators 32, 34 are applied to the inputs of NAND gate 40. The outputs $V_9$, $V_{10}$ of the NAND gates 38, 40 are applied to the inputs of NAND gate 42. The output $V_o$ of the OR gate 36 or of the NAND gate 42 represents the single data signal that is sent to a decoder or microprocessor for further signal processing.

In FIG. 1, the high reference voltage $V_H$ and the low reference voltage $V_L$ are equal to:

$$V_L = \frac{V_r}{R_{11} + R_{12} + R_{13}} \times R_{13}$$

$$V_H = \frac{V_r}{R_{11} + R_{12} + R_{13}} \times (R_{12} + R_{13})$$

When the amplitude of the serial signal $V_{in}$ equals 5 volts, the voltages $V_1$, $V_3$ at the inputs of the communication lines 12, 14 equal zero. The voltages $V_2$, $V_4$ at the outputs of the communication lines 12, 14 are determined from the following equations:

$$V_2 = \frac{V_r \times R_{eq}}{R_7 + R_{eq}}$$

$$V_4 = \frac{V_r \times R_{-eq}}{R_8 + R_{-eq}}$$

Where:

$$R_{eq} = \frac{(R_3 + R_5) \times R_9}{R_3 + R_5 + R_9}$$

$$R_{-eq} = \frac{(R_4 + R_6) \times R_{10}}{R_4 + R_6 + R_{10}}$$

The above resistor values are selected such that when the outputs of the communication lines 12, 14 are between the high and low reference voltages, the voltages $V_5$, $V_6$ at the outputs of the detecting means are logical high and when the outputs of the communication lines 12, 14 are not within the high and low reference voltages, the voltages at $V_5$, $V_6$ are logical low.

When communication line 12 is open circuited, the voltage $V_2$ at the output of line 12 is greater than the high reference voltage and, therefore, the output of the detecting means is logical low. $V_2$ is found from the following equation:

$$V_2 = \frac{V_r \times R_9}{R_7 + R_9}$$

When $V_{in}$ is logically high, $V_4$ equals:

$$V_4 = \frac{V_r \times R_{-eq}}{R_8 + R_{-eq}}$$

When $V_{in}$ is logically low, $V_4$ equals:

$$V_4 = \frac{V_r \times R_{10}}{R_8 + R_{10}}$$

Since the output $V_5$ of the detecting means 16 is logically low and the output $V_6$ of the other detecting means 18 switches between logically high and logically low, the output $V_o$ of the OR gate will equal the output $V_6$ of the detecting means 18. The OR gate will have a high output if any one or more inputs is high.

When communication line 12 is shorted to ground, the voltage $V_2$ at the output of line 12 is less than the low reference voltage and, therefore, the output of the detecting means 16 is logically low. $V_2$ is found from the following equation:

$$R_{59} = \frac{R_5 \times R_9}{R_5 + R_9}$$

$$V_2 = \frac{V_r \times R_{59}}{R_7 + R_{59}}$$

The voltage $V_4$ at the output of the communication line 14 is determined from one of the following equations, depending on whether $V_{in}$ is logically high or low.

$$V_4 = \frac{V_r \times R_{-eq}}{R_8 + R_{-eq}}$$

$$V_4 = \frac{V_r \times R_{10}}{R_8 + R_{10}}$$

Since the output $V_5$ of detecting means 16 is logically low the output $V_o$ of the combining means will equal the output $V_6$ of the other detecting means 18.

When the communication line 12 is shorted to +12V, the resistors are selected such that $V_2$ is greater than the high reference voltage. Since $V_2$ is greater than the high reference voltage, the output $V_5$ of the detecting means 16 is zero.

$$\frac{V_2 - 12}{R_5} + \frac{V_2 - V_r}{R_7} + \frac{V_2}{R_9} = 0$$

The voltage $V_4$ at the output of the communication line 14 is determined from one of the following equations, depending on whether $V_{in}$ is logically high or low.

$$V_4 = \frac{V_r \times R_{-eq}}{R_8 + R_{-eq}}$$

$$V_4 = \frac{V_r \times R_{10}}{R_8 + R_{10}}$$

Since the output $V_5$ of detecting means 16 is logically low the output $V_o$ of the combining means will equal the output $V_6$ of the other detecting means 18.

The symmetry of the two communication lines 12, 14 allows either of the two lines 12, 14 to contain the fault condition and still maintain the integrity of the serial system. The correct serial data is recovered regardless whether there is a fault on one of the two lines 12, 14. As long as the resistor values for R3–R10 are selected to make logic high outputs of the communication lines 12, 14 fall in between the window limits $V_L$ and $V_H$ and all other logic low outputs and fault conditions will be outside the window limits, the system will work properly.

FIG. 2 illustrates the communication system of FIG. 1 with actual values substituted for the components. When $V_{in}$ equals 5 volts, the high and low reference voltages are equal to the following:

$$V_L = \frac{5V}{20k + 10k + 20k} \times 20k = 2V$$

$$V_H = \frac{5V}{20k + 10k + 20k} \times (20k + 10k) = 3V$$

When either voltage $V_2$ or $V_4$ at the outputs of the communication lines 12, 14 are not within the predetermined voltage range of 2 to 3 volts, a fault condition or logical low is present on that line.

When $V_{in}$ equals 5 volts, transistors Q1, Q2 are closed and the voltages at $V_1$ and $V_3$ are equal to zero. $V_2$ and $V_4$ are determined from the following equation:

$$V_2 = V_4 = \frac{5V}{3.55k + 3.6k} \times 3.55k = 2.48V$$

Since the voltages at $V_2$ and $V_4$ are within the predetermined voltage range of 2 to 3 volts, the outputs $V_5$ and $V_6$ of the detecting means 16, 18 are logically high. The output $V_o$ of the combining means 20 is equal to 5 volts, the same as $V_{in}$.

When $V_{in}$ equals 0 volts, transistors Q1, Q2 are open. $V_2$ and $V_4$ are determined from the following equation:

$$V_2 = V_4 = \frac{5V}{3.6k + 10k} \times 10k = 3.67V$$

Since the voltages at $V_2$ and $V_4$ fall outside of the predetermined voltage range, the outputs $V_5$ and $V_6$ of the detecting means 16, 18 is logically low. The output of $V_o$ of the combining means 20 is equal to zero, the same as $V_{in}$.

If communication line 12 is open circuited, communication line 14 is connected to the detecting means 18 and $V_{in}$ equals 5 volts, communication line 14 will continue to transmit the correct serial signal. $V_2$ and $V_4$ are determined from the following equations:

$$V_2 = \frac{5V}{3.6k + 10k} \times 10k = 3.67V$$

When $V_{in}$ is 5 volts, $V_4$ equals:

$$V_4 = \frac{5V}{3.55k + 3.6k} \times 3.55k = 2.48V$$

When $V_{in}$ is 0 volts, $V_4$ equals:

$$V_4 = \frac{5V}{3.6k + 10k} \times 10k = 3.67V$$

Since V2 is greater than the high reference voltage of 3 volts, it falls outside of the predetermined voltage range. $V_4$ falls within the predetermined voltage range. Therefore, the output $V_5$ of the detecting means 16 is logically low and the output $V_6$ of the detecting means 18 is logically high. The output $V_o$ of the combining means is logically high which is the output $V_6$ of the detecting means 18. Thus, the correct data signal is transmitted regardless of the fact that the communication line 12 is open circuited.

If communication line 12 is shorted to ground, communication line 14 is connected to the detecting means 18 and $V_{in}$ is 5 volts, communication line 14 will continue to transmit the correct serial signal, as shown by the following equations:

$$R_{eq} = \frac{2.2k \times 10k}{2.2k + 10k} = 1.8k$$

$$V_2 = \frac{5V}{3.6k + 1.8k} \times 1.8k = 1.67V$$

Since $V_2$ is less than the low reference voltage of 2 volts, it falls outside of the predetermined voltage range. $V_4$ is determined from the same equations as when line 12 was open circuited. The output of the detecting means 16 is logically low and the output of the detecting means 18 is logically high. The output $V_o$ of the combining means 20 is logically high which is the output $V_6$ of the detecting means 18. The correct data signal is transmitted.

If communication line 12 is shorted to a positive voltage supply or +5V in FIG. 2, communication line 14 is connected to the detecting means 18 and $V_{in}$ is equal to 5 volts, communication line 14 will continue to transmit the correct serial signal, as shown by the following equations:

$$\frac{V_2 - 12}{2.2k} + \frac{V_2 - 5}{3.6k} + \frac{V_2}{10k} = 0$$

Solving the above equation for $V_2$, $V_2$ equals 6.844 V. Since $V_2$ is greater than the high reference voltage of 3 volts, the output $V_5$ of the detecting means 16 is logically low. Again, $V_4$ is determined from the same equations as when line 12 was open circuited and shorted to ground. Thus, the output $V_6$ of the detecting means 18 is logically high. The output $V_o$ of the combining means is logically high or equals the output $V_6$ of the other detecting means 18.

FIG. 3 illustrates the same circuit diagram of FIGS. 1 and 2, however, the voltage supply is 12 volts. The high and low reference voltages equal the following:

$$V_L = \frac{12V}{20k + 10k + 20k} \times 20k = 4.8V$$

$$V_H = \frac{12V}{20k + 10k + 20k} \times (20k + 10k) = 7.2V$$

When $V_{in}$ equal 5 volts, transistors Q1, Q2 are closed and the voltages $V_1$ and $V_3$ are equal to zero. $V_2$ and $V_4$ are determined from the following equation:
Since voltages at $V_2$ and $V_4$ fall within of the $$V_2 = V_4 = \frac{12V}{3.55k + 3.6k} \times 3.55k = 5.96V$$

predetermined voltage range, the outputs $V_5$ and $V_6$ of the detecting means 16, 18 is logically high. The output $V_o$ of the combining means 20 is logically high or +5V, the same as $V_{in}$.

When $V_{in}$ equals zero volts, transistors Q1, Q2 are open. $V_2$ and $V_4$ are equaled to the following:

$$V_2 = V_4 = \frac{12V}{3.6k + 10k} = 8.82V$$

Since the voltages at $V_2$ and $V_4$ fall outside of the predetermined voltage range, the outputs $V_5$ and $V_6$ of the detecting means 16, 18 is logically low. The output of $V_o$ of the combining means 20 is equal to zero, the same as $V_{in}$.

If the communication line 12 is open circuited, communication line 14 is connected to the detecting means 18 and $V_{in}$ equals 5 volts, communication line 14 will continue to transmit the correct serial signal. $V_2$ and $V_4$ are equal to the following:

$$V_2 = \frac{12V}{3.6k + 10k} \times 10k = 8.82V$$

When $V_4$ equals 5 volts, $V_4$ equals:

$$V_4 = \frac{5V}{3.55k + 3.6k} \times 3.55k = 2.48V$$

When $V_4$ equals 0 volts, $V_4$ equals:

$$V_4 = \frac{5V}{3.6k + 10k} \times 10k = 3.67V$$

Since $V_2$ is greater than the high reference voltage of 7.2 volts, it falls outside of the predetermined voltage range. $V_4$ falls within the predetermined voltage range. Therefore, the output $V_5$ of the detecting means 16 is logically low and the output $V_6$ of the detecting means 18 is logically high. The output $V_o$ of the combining means 20 is logically high which is the output $V_6$ of the detecting means 18. Thus, the correct data signal is transmitted regardless of the fact that the communication line 12 is open circuited.

If the communication 12 is shorted to ground, communication line 14 is connected to the detecting means 18 and $V_{in}$ is 5 volts, communication 14 will continue to transmit the correct serial signal, as shown by the following equations:

$$R_{eq} = \frac{2.2k \times 10k}{2.2k + 10k} = 1.8k$$

$$V_2 = \frac{12V}{3.6k + 1.8k} \times 1.8k = 4.0V$$

Since $V_2$ is less than the low reference voltage of 4.8 volts, it falls outside of the predetermined voltage range. $V_4$ is determined from the same equation when line 12 was open circuited. The output $V_5$ of the detecting means 16 is logically low and the output $V_6$ of the detecting means 18 is logically high. The output of $V_o$ of the combining means 20 is logically high which is the output $V_6$ of the detecting means 18. The correct data signal is transmitted.

If communication line 12 is shorted to a positive voltage supply or +12V in FIG. 3, communication line 14 is connected to the detecting means 18 and $V_{in}$ is equal to 5 volts, communication 14 will continue to transmit the correct serial signal, as shown by the following equations:

$$\frac{V_2 - 12}{2.2k} + \frac{V_2 - 12}{3.6k} + \frac{V_2}{10k} = 0$$

Solving the above equation for $V_2$, $V_2$ equals 10.55 V. Since $V_2$ is greater than the high reference voltage of 7.2 volts, the output $V_5$ of the detecting means 16 is logically low. Again $V_4$ is determined from the same equation as when line 12 was open circuited and shorted to ground. Thus, the output $V_6$ of the detecting means 18 is logically high. The output $V_o$ of the combining means is logically high or equals the output $V_6$ of the other detecting means 18.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A fault tolerant communication system comprising;

at least two communication lines, each of the at least two communication lines provided with respective identical data signals, wherein outputs of the at least two communication lines are adapted such that active levels of each of the respective data signals appear within a predetermined voltage range;

at least two detecting means respectively coupled to the at least two communication lines wherein each of the at least two detecting means transmits one of the respective data signals only if the respective active levels are within the predetermined voltage range; and combining means coupled to each of the at least two detecting means for combining the respective data signals from the at least two detecting means into a single data signal wherein the combining means transmits the single data signal only if the active levels of at least one of the respective data signals is within the predetermined voltage range.

2. The fault tolerant communication system of claim 1 wherein the at least two detecting means comprise at least two window comparators respectively coupled to the outputs of the at least two communication lines to detect when the output of the at least two communication lines falls within the predetermined voltage range.

3. The fault tolerant communication system of claim 1 wherein the outputs of the at least two communication lines are adapted such that the active levels of each of the respective data signals appear within the predetermined voltage range by providing a voltage divider at the outputs of each of the at least two communication lines to define the predetermined voltage range.

4. The fault tolerant communication system of claim 3 wherein the voltage divider is a resistor tree which defines the predetermined voltage range based on the ratio between resistors in the resistor tree.

5. The fault tolerant communication system of claim 1 wherein each of the at least two window comparators includes upper and lower comparators having an inverting input and a non-inverting input and having outputs tied together to provide a voltage output, wherein the output of one of the respective communication lines is applied to the inverting input of the upper comparator and to the non-inverting input of the lower comparator, a high reference voltage is applied to the non-inverting input of the upper comparator and a low reference voltage is applied to the inverting input of the lower comparator, whereby the voltage output is high when the output of the communication line falls between the high and low reference voltages and the voltage output is low when the output of the respective communication line falls outside of the high and low reference voltages which indicates that a fault on the communication line has occurred.

6. The fault tolerant communication system of claim 1 wherein the combining means is a logical OR gate having inputs connected to the outputs of the at least two detecting means.

\* \* \* \* \*